United States Patent
Cho et al.

(10) Patent No.: US 10,063,841 B2
(45) Date of Patent: Aug. 28, 2018

(54) MOBILE TERMINAL AND METHOD FOR CONTROLLING THE SAME

(71) Applicant: LG ELECTRONICS INC., Seoul (KR)

(72) Inventors: Ayoung Cho, Seoul (KR); Yunsup Shin, Seoul (KR); Salkmann Ji, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/448,423

(22) Filed: Mar. 2, 2017

(65) Prior Publication Data

US 2017/0180709 A1 Jun. 22, 2017

Related U.S. Application Data

(63) Continuation of application No. 14/970,065, filed on Dec. 15, 2015.

(30) Foreign Application Priority Data

Jun. 17, 2015 (KR) .......................... 10-2015-0086077

(51) Int. Cl.
*H04N 13/00* (2018.01)
*H04N 13/02* (2006.01)

(52) U.S. Cl.
CPC ..... *H04N 13/0253* (2013.01); *H04N 13/0022* (2013.01); *H04N 2013/0081* (2013.01)

(58) Field of Classification Search
CPC ........... H04N 13/0253; H04N 13/0022; H04N 2013/0081; G06T 7/586
See application file for complete search history.

(56) References Cited

U.S. PATENT DOCUMENTS

| | | | |
|---|---|---|---|
| 2014/0002609 A1* | 1/2014 | Kim | H04N 13/0253 348/46 |
| 2014/0028861 A1 | 1/2014 | Holz | |
| 2014/0111423 A1 | 4/2014 | Park et al. | |
| 2014/0240461 A1 | 8/2014 | Russell et al. | |
| 2014/0240464 A1 | 8/2014 | Lee | |
| 2015/0002734 A1 | 1/2015 | Lee | |

(Continued)

FOREIGN PATENT DOCUMENTS

JP 2006-340000 12/2006

OTHER PUBLICATIONS

U.S. Appl. No. 14/970,065, Office Action dated Apr. 20, 2017, 13 pages.

(Continued)

*Primary Examiner* — Neil Mikeska
(74) *Attorney, Agent, or Firm* — Lee, Hong, Degerman, Kang & Waimey PC

(57) ABSTRACT

There are provided a mobile terminal including light emitting devices and a method for controlling the same. A mobile terminal includes a camera, a light emitting unit including a plurality of light emitting devices, the light emitting unit emitting light toward a space corresponding to an image received through the camera, and a controller for controlling light emitting devices, which emit light toward a space corresponding to a portion of the image among the plurality of light emitting devices, to be used in extracting depth information of the portion.

11 Claims, 16 Drawing Sheets

(56) References Cited

U.S. PATENT DOCUMENTS

| | | | |
|---|---|---|---|
| 2015/0009290 A1 | 1/2015 | Mankowski et al. | |
| 2015/0022545 A1* | 1/2015 | Kang | H04N 1/60 345/600 |
| 2015/0029310 A1* | 1/2015 | Tien | H04N 13/0253 348/46 |
| 2015/0092019 A1* | 4/2015 | Asano | G01C 3/085 348/46 |
| 2015/0341619 A1* | 11/2015 | Meir | G01S 17/06 348/47 |
| 2016/0109232 A1* | 4/2016 | Shin | H04N 5/2256 348/140 |
| 2016/0182891 A1 | 6/2016 | Ko et al. | |
| 2016/0286202 A1* | 9/2016 | Romano | G01S 17/46 |
| 2016/0373728 A1* | 12/2016 | Cho | H04N 13/0253 |

OTHER PUBLICATIONS

PCT International Application No. PCT/KR2015/014290, Notification of Transmittal of the International Search Report and the Written Opinion of the International Searching Authority, or Declaration dated Apr. 21, 2016, 10 pages.

U.S. Appl. No. 14/970,065, Final Office Action dated Sep. 18, 2017, 10 pages.

\* cited by examiner

FIG. 2A
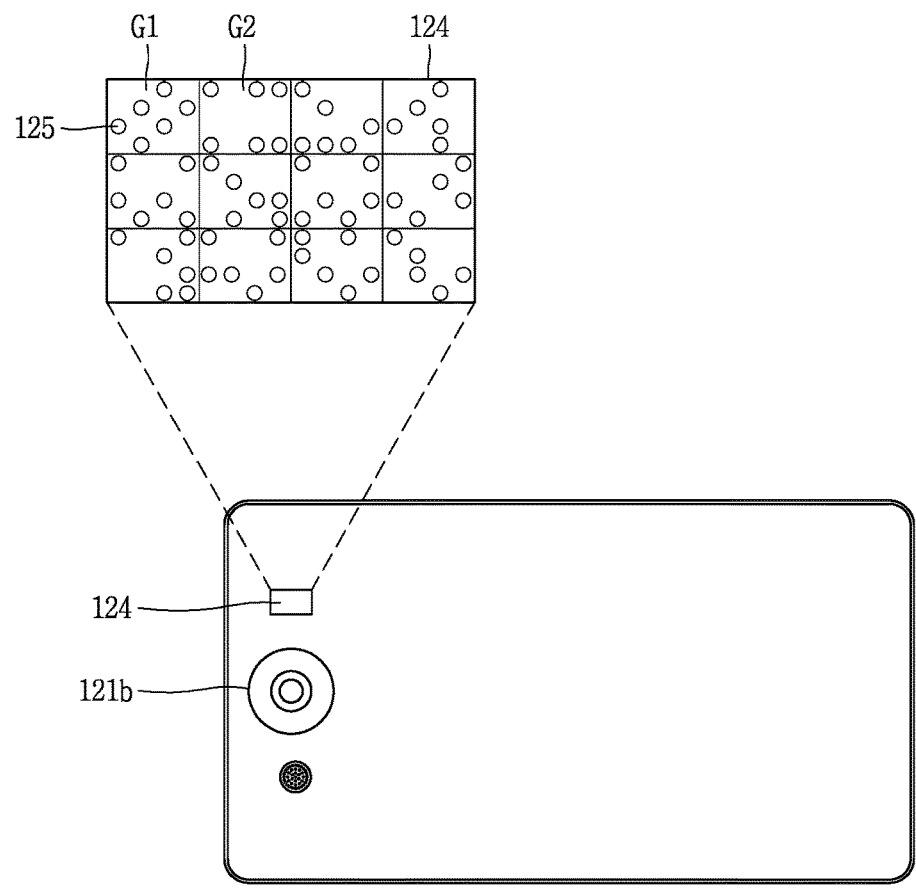
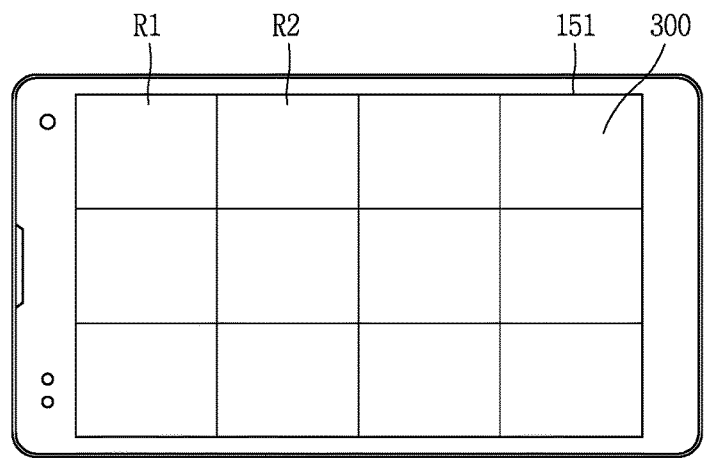

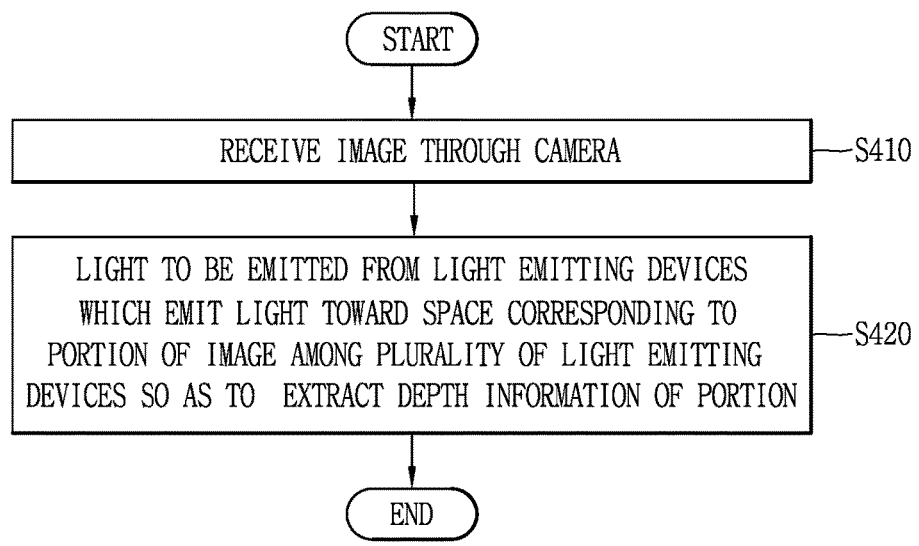

FIG. 9
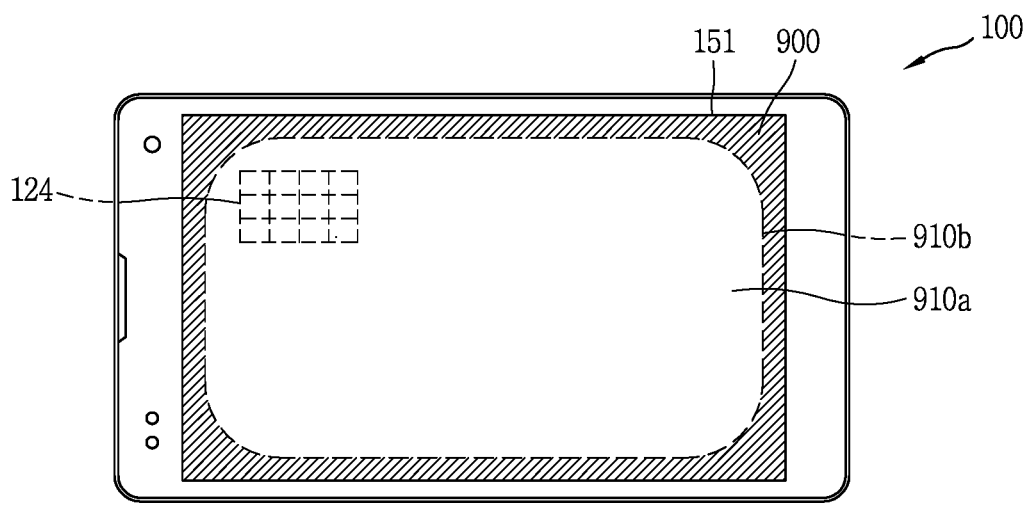
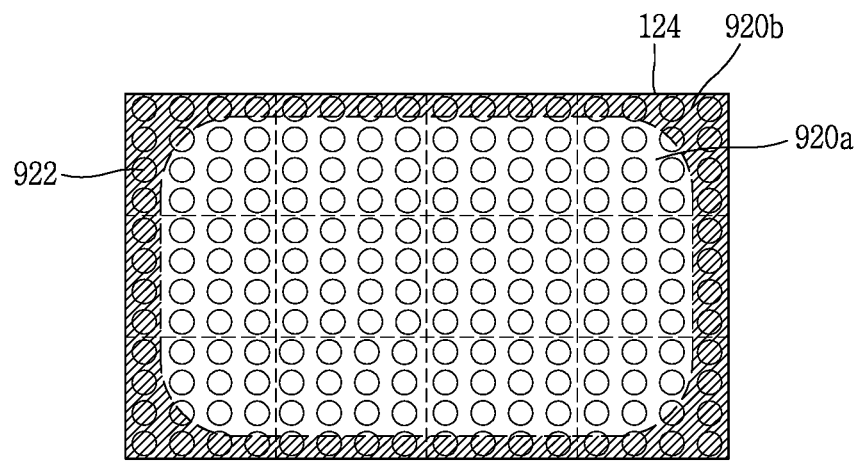

FIG. 14
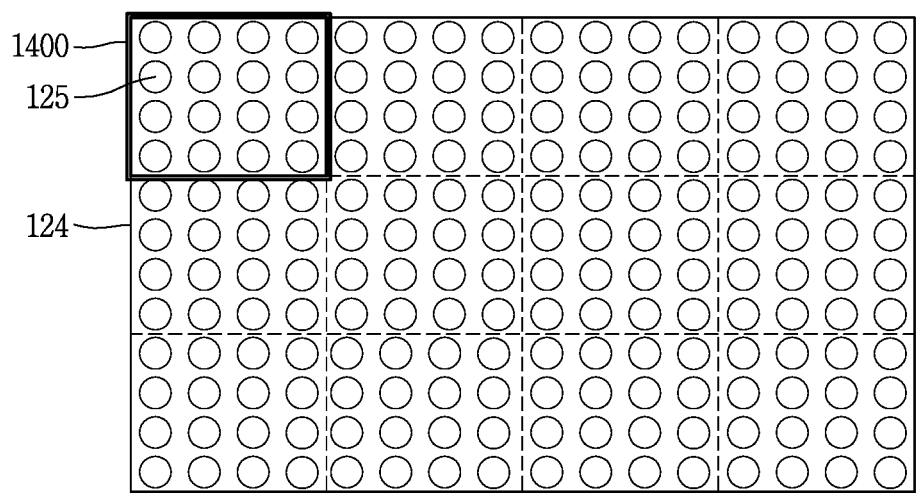

MOBILE TERMINAL AND METHOD FOR CONTROLLING THE SAME

CROSS-REFERENCE TO RELATED APPLICATIONS

This application is a continuation of U.S. patent application Ser. No. 14/970,065, filed on Dec. 15, 2015, currently pending, which claims the benefit of earlier filing date and right of priority to Korean Application No. 10-2015-0086077, filed on Jun. 17, 2015, the contents of which are all hereby incorporated by reference herein in their entirety.

BACKGROUND OF THE INVENTION

1. Field of the Invention

The present disclosure relates to a mobile terminal including light emitting devices and a method for controlling the same.

2. Description of the Conventional Art

As the performance of a camera is developed, various functions using the camera have recently developed. For example, functions of photographing high-quality still images or moving images or generating 3D images by using depth information (depth values) of images received through the camera have actively developed.

A light emitting device plays an important role in the various functions using the camera. Here, the light emitting device functions to emit light into a space corresponding to an image received through the camera.

Accordingly, it is required to develop a light emitting device for performing various functions using a camera, a control method of a light emitting device, and the like.

SUMMARY OF THE INVENTION

Therefore, an aspect of the detailed description is to provide a mobile terminal and a method for controlling the same, which can extract depth information of an image received through a camera by using light emitted from light emitting devices.

Another aspect of the detailed description is to provide a mobile terminal and a method for controlling the same, which can control light emitting devices by using the optimized method.

To achieve these and other advantages and in accordance with the purpose of this specification, as embodied and broadly described herein, a mobile terminal includes: a camera; a light emitting unit configured to include a plurality of light emitting devices, and emit light toward a space corresponding to an image received through the camera; and a controller configured to control light emitting devices, which emit light toward a space corresponding to a portion of the image among the plurality of light emitting devices, to be used in extracting depth information of the portion.

In one exemplary embodiment, the plurality of light emitting devices may be grouped into a plurality of groups. The controller may control light emitting devices, which are included in a group formed to emit light toward the space corresponding to the portion among the plurality of groups, to emit light.

In one exemplary embodiment, when depth information of a portion in the image is extracted, the controller may control light emitting devices, which are included in a first group formed to emit light toward a space corresponding to the first portion among the plurality of groups, to emit light. When depth information of a second portion different from the first portion in the image is extracted, the controller may control light emitting devices, which are included in a second group formed to emit light toward a space corresponding to the second portion among the plurality of groups, to emit light.

In one exemplary embodiment, when the image is photographed as a still image, the controller may control the plurality of groups to sequentially emit light in a predetermined order as time elapses.

In one exemplary embodiment, the predetermined order may be determined based on an order in which a plurality of areas included in the image are photographed as still images as time elapses.

In one exemplary embodiment, the controller may control the light emitting unit in different manners, based on an operation mode related to the camera.

In one exemplary embodiment, when the operation mode is a first operation mode related to the camera, the controller may control the plurality of groups in a first manner. When the operation mode is a second operation mode related to the camera, the controller may control the plurality of groups in a second manner different from the first manner.

In one exemplary embodiment, the controller may extract an area having depth information within a predetermined range from the image, and control light emitting devices, which are included in a group formed to emit light toward a space corresponding to the extracted area among the plurality of groups, to emit light.

In one exemplary embodiment, the area having the depth information within the predetermined range may be extracted based on depth information of an image corresponding to a predetermined area in the image.

In one exemplary embodiment, the mobile terminal may further include a sensing unit configured to sense a movement of the mobile terminal. The controller may determine a group emitting light among the plurality of groups, based on at least one of a speed and a direction of the movement.

In one exemplary embodiment, if a new image is received to the camera by the movement, the controller may control light emitting devices, which are included in a group formed to emit light toward a space corresponding to the new image among the plurality of groups, to emit light.

In one exemplary embodiment, the light emitting unit may include a lens configured to refract light emitted from the plurality of light emitting devices. The controller may adjust light emitting degrees of the plurality of light emitting devices, based on the brightness of light passing through the lens and then being reflected by an object and returned to the mobile terminal.

To achieve these and other advantages and in accordance with the purpose of this specification, as embodied and broadly described herein, a method for controlling a mobile terminal includes: receiving an image through a camera; and allowing light emitting devices, which emit light toward a space corresponding to a portion in the image among a plurality of light emitting devices, to emit light, so as to be used in extracting depth information of the portion.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 2A to 2C are conceptual diagrams illustrating a light emitting unit provided in the mobile terminal according to the exemplary embodiment;

FIG. 4 is a flowchart representatively illustrating a control method according to an exemplary embodiment;

FIG. 9 is a conceptual diagram illustrating the control method described in FIG. 8;

FIG. 14 is a conceptual diagram illustrating a method for controlling a plurality of light emitting devices provided in the light emitting unit according to an exemplary embodiment.

DETAILED DESCRIPTION OF EXEMPLARY EMBODIMENTS

Figure 1A:
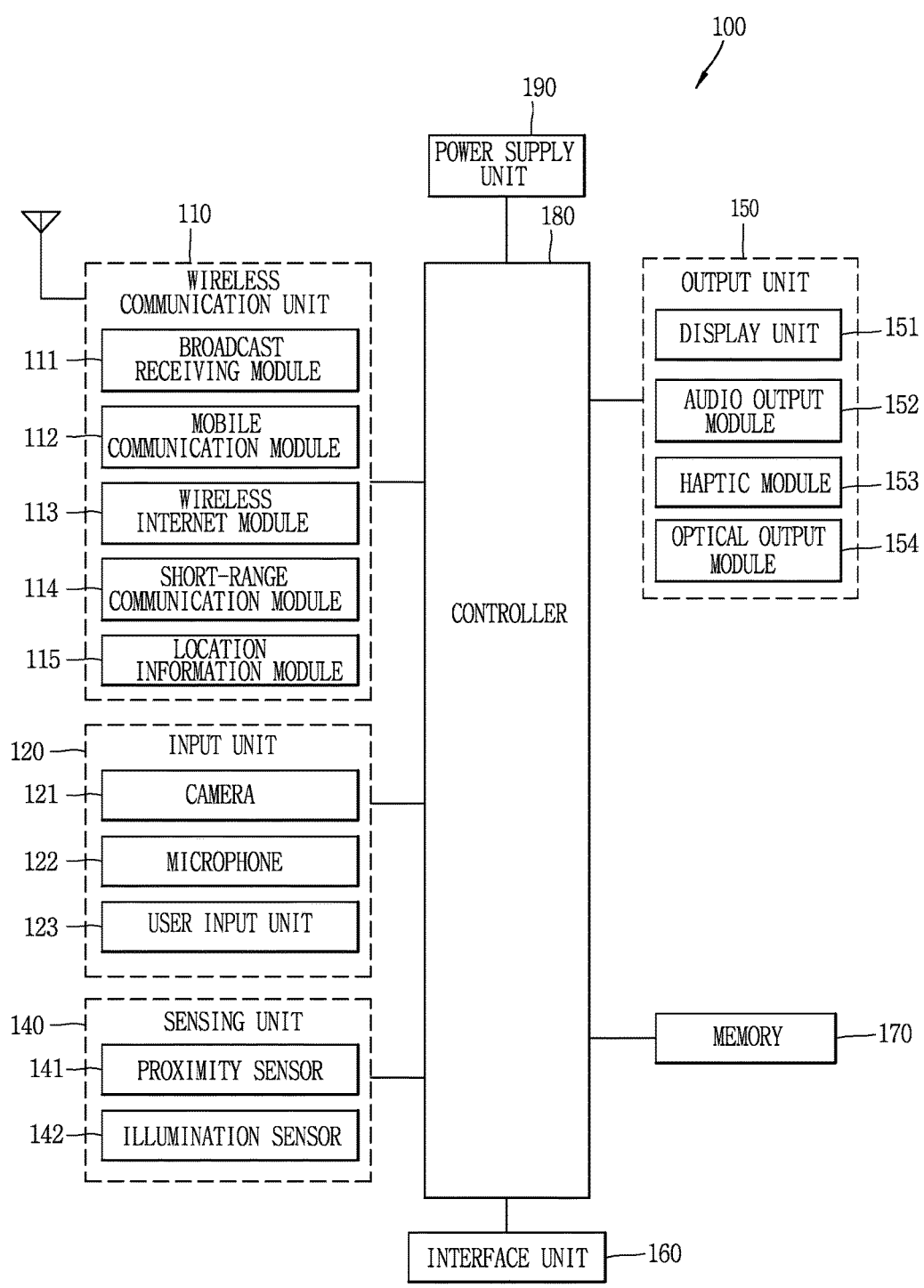
FIG. 1A is a block diagram illustrating a mobile terminal according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
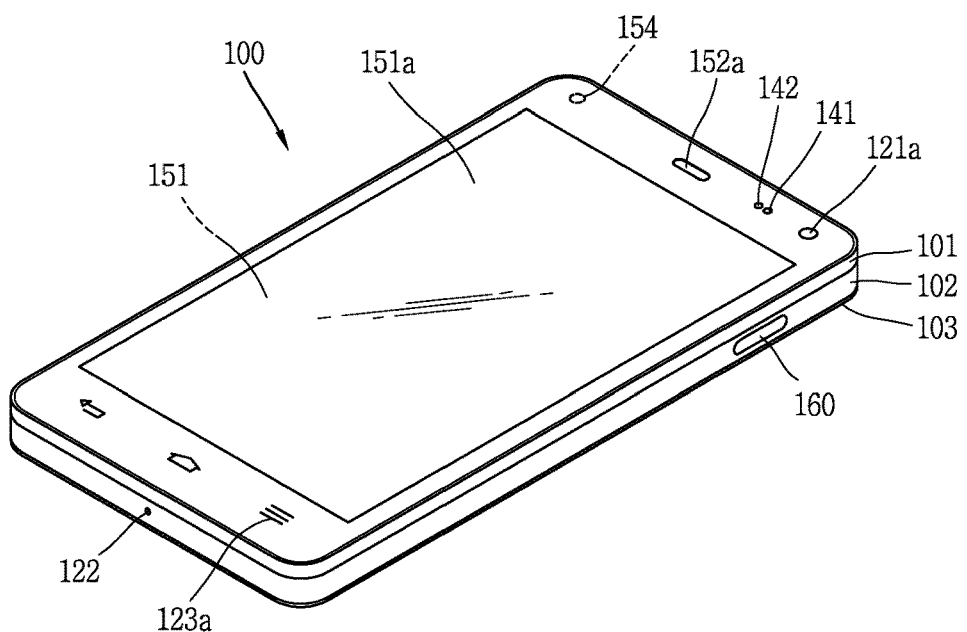
FIGS. 1B and 1C are conceptual diagrams illustrating an example of the mobile terminal viewed in different directions according to the exemplary embodiment.
Figure 1C:
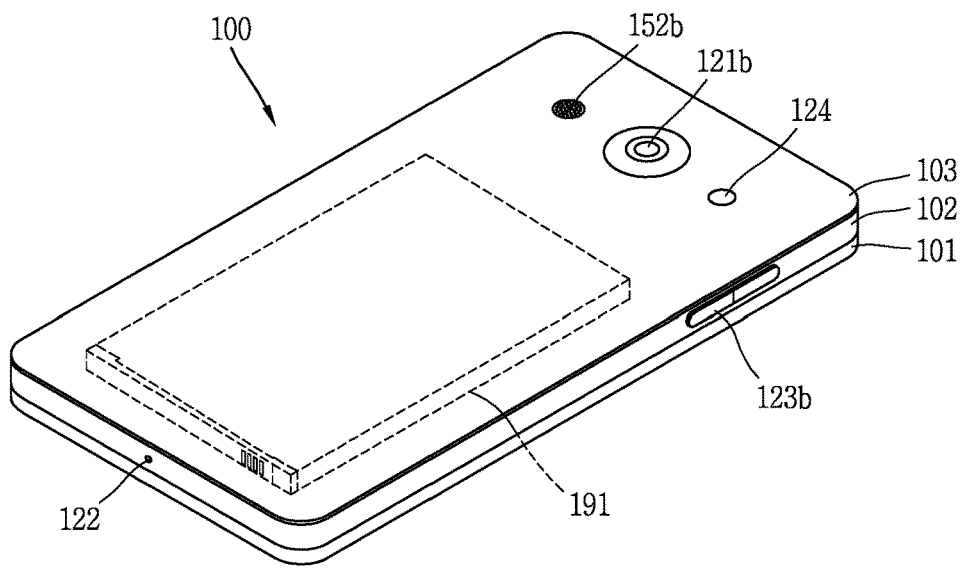
Figure 10:
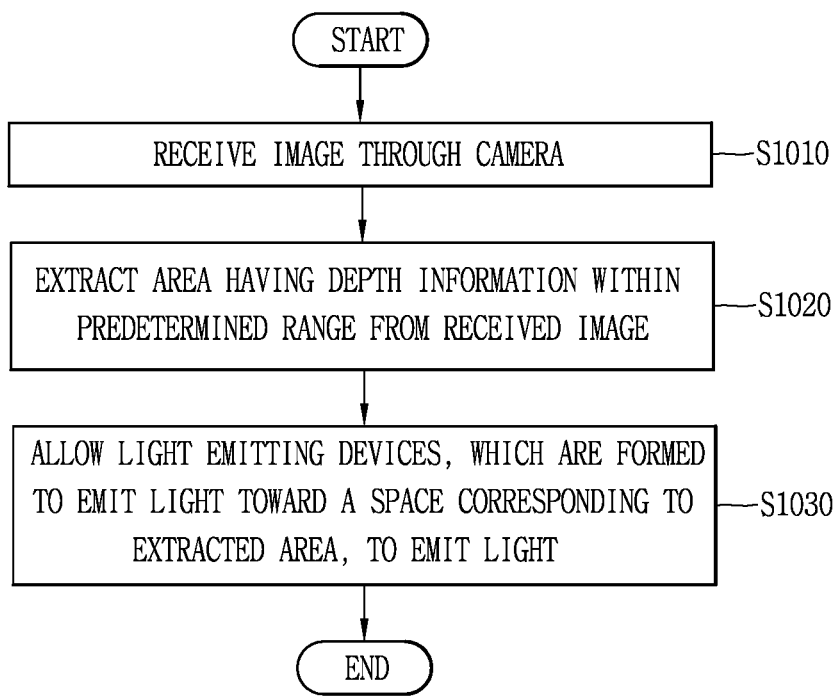
FIGS. 10 and 12 are flowcharts illustrating control methods of controlling the light emitting unit in different manners according to operation modes of a camera.

Reference is now made to FIGS. 1A-10, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supplyx unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a method for extracting depth information of an image received through a camera by using light emitting devices and a method for controlling the light emitting devices in the mobile terminal according to an exemplary embodiment will be described in detail with the accompanying drawings.

Hereinafter, in a case where at least two images are arranged in a form of 2 by 2 on one figure (FIG. N) when the methods are described with the accompanying drawings, an image disposed at the left top end is called as a "first figure," an image disposed at the right top end is called as a "second figure," an image disposed at the right bottom end is called as a "third figure," and an image disposed at the left bottom end is called as a "fourth figure."

Also, in a case where at least two images are arranged in a line in the direction from the top end to the bottom end on one figure (FIG. N), the images from the image disposed at the topmost end are sequentially called as "first, second, . . . images."

Also, in a case where at least two images are arranged in a line in the direction from the left end to the right end on one figure (FIG. N), the images from the image disposed at the leftmost end are sequentially called as "first, second, . . . images."

The mobile terminal 100 according to the exemplary embodiment may extract depth information of an image received through the camera 121 (see FIG. 1A).

The image received through the camera may be called as a preview image. Specifically, the preview image refers to an image received in real time through the camera. The preview image may be changed based on that the mobile terminal provided with the camera 121 is moved by an external force or that a subject is moved.

The depth information may be called as a depth value, depth information, or the like. The depth information may mean a distance (or distance value) between a subject corresponding to a pixel included in the image and the mobile terminal (more specifically, the camera).

For example, when the distance between a subject corresponding to a specific pixel of the image and the mobile terminal is n, the depth information of the specific pixel may be a specific value corresponding to the n. The specific value corresponding to the n may be the n or a value changed by a predetermined algorithm.

When the coordinates of the image are set to an x-axis and a y-axis perpendicular to the x-axis, the depth information may mean a value corresponding to a z-axis perpendicular to the x-axis and the y-axis. The absolute value of the depth information may increase as the distance between the subject and the mobile terminal increases.

The depth information may be applied in various fields. For example, the depth information may be used in photographing/generating 3D stereoscopy, generating 3D printing data used in 3D printers, or sensing movement of an object (subject) around the mobile terminal.

The mobile terminal 100 according to the exemplary embodiment may extract depth information of an image received through the camera by using various methods. For example, the controller 180 (see FIG. 1A) may extract depth information by using a stereo vision method of extracting depth information using at least two cameras, a structure light method of extracting depth information using light emitting devices arranged to form a predetermined pattern, a time of flight (ToF) method of extracting depth information based on a time when light emitted from a light emitting device is reflected and returned, etc., or through combinations thereof.

Hereinafter, the extraction of depth information by using the structure light method among the above-described methods will be mainly described.

The structure light method is a method of allowing light to be emitted to a subject by controlling a plurality of light emitting devices arranged to have a predetermined pattern, sensing light reflected and returned from the subject, and then extracting depth information based on the sensed light (or a pattern of the sensed light). For example, the controller 180 of the mobile terminal according to the exemplary embodiment controls a plurality of light emitting devices arranged to have a predetermined pattern to emit light to a subject. Subsequently, the controller 180 of the mobile terminal may sense light reflected and returned from the subject through the camera 121 or the sensing unit 140 (see FIG. 1A).

In this case, the controller 180 may extract depth information of an image received through the camera 121, based on the sensed result. For example, the controller 180 may extract depth information of an image received through the camera 121 by comparing a pattern formed by the reflected and returned light with the predetermined pattern or comparing a time for which light is emitted and then reflected and returned, an intensity of the light, etc. To this end, the plurality of light emitting devices may be formed to emit light toward a space corresponding to the image received through the camera 121.

The predetermined pattern may be determined (set) by a user, or be previously determined when products of the mobile terminal are produced. Also, the predetermined pattern may be changed by a user's request or control of the controller.

The plurality of light emitting devices may emit infrared light. Also, the light emitting device may be a laser diode for converting an electric signal into an optical signal. For example, the light emitting device may be a vertical cavity surface emitting laser (VCSEL).

In the present disclosure, the structure light method is used, so that it is possible to extract depth information of an image through only one camera (an infrared camera or a 3D camera). Also, it is possible to extract depth information even when the subject has a single color. The structure light method may be combined with the stereo vision method using at least two cameras or the ToF method, thereby improving the accuracy of depth information.

Hereinafter, the light emitting devices used to extract depth information of an image received through the camera will be described in detail.

Figure 2B:
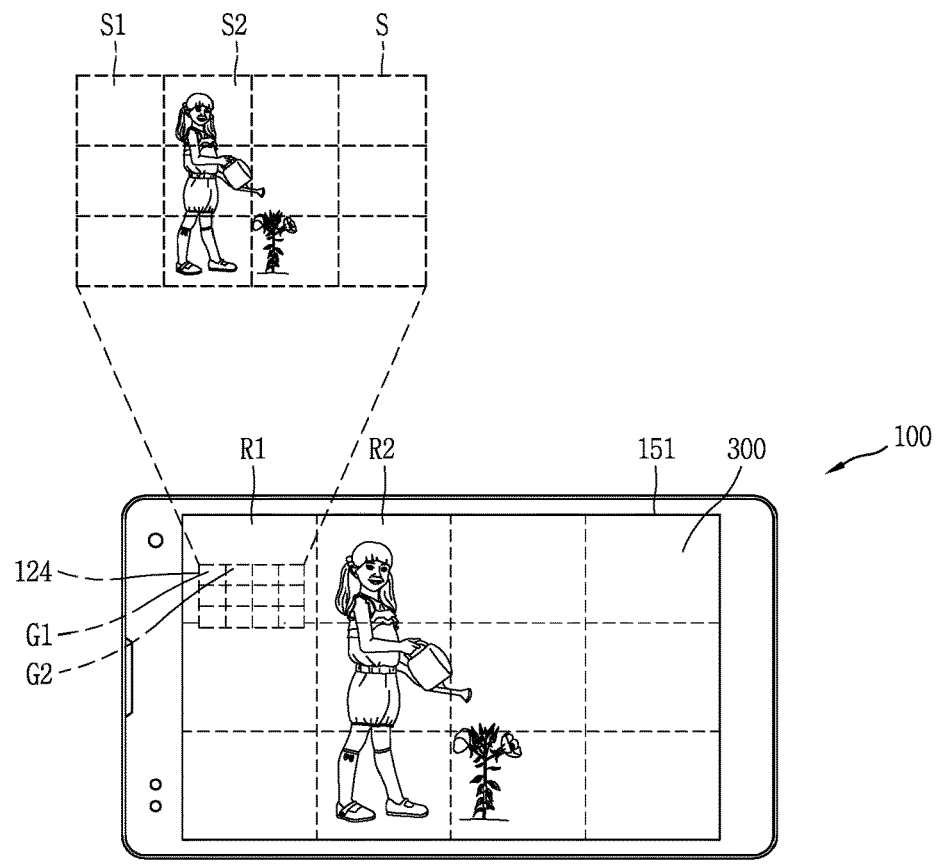
Figure 2C:
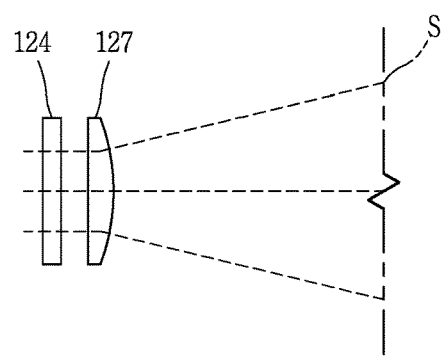
Figure 3A:
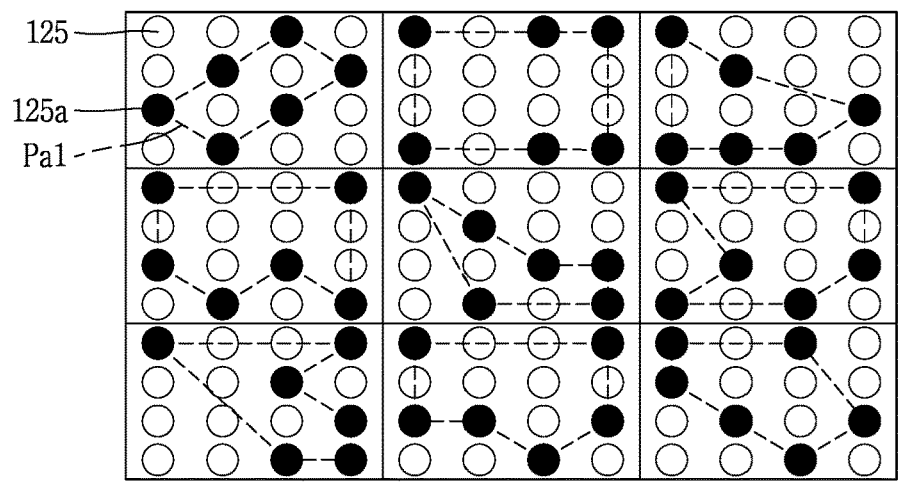
FIGS. 3A and 3B are conceptual diagrams illustrating a plurality of light emitting devices provided in the light emitting unit according to the exemplary embodiment.
Figure 3B:
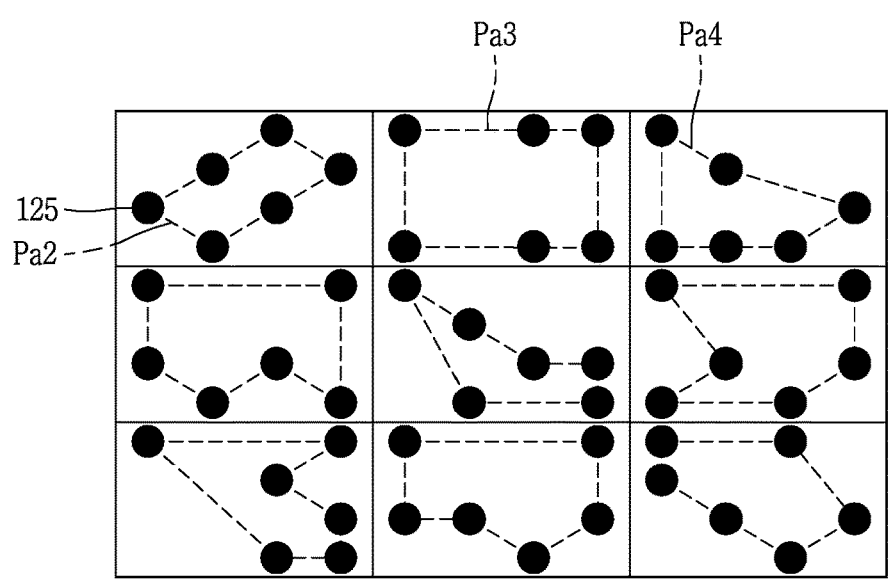

FIGS. 2A to 2C are conceptual diagrams illustrating a light emitting unit provided in the mobile terminal according to the exemplary embodiment. FIGS. 3A and 3B are conceptual diagrams illustrating a plurality of light emitting devices provided in the light emitting unit according to the exemplary embodiment.

The mobile terminal 100 according to the exemplary embodiment may include a light emitting unit 124. The light emitting unit 124 may have the same configuration as the above-described flash 124, or have a separate configuration. Hereinafter, reference numeral 124 is used for the light emitting unit.

The light emitting unit 124 may include at least one light emitting device 125. Specifically, the light emitting unit 124 may include a plurality of light emitting devices 125, and the plurality of light emitting devices 125 may be arranged in various manners. The arrangement of the plurality of light emitting devices 125 will be described later with reference to FIGS. 3A and 3B.

The light emitting unit 124 may be disposed adjacent to the camera 121. For example, the light emitting unit 124, as shown in FIG. 2A, may be disposed around the camera 121*b*. Although not shown in this figure, the light emitting unit 124 may be integrally formed with the camera 121*b*.

Each of the plurality of light emitting devices 125 included in the light emitting unit 124, as described above, may be a VCSEL that is one of infrared diodes. Each light emitting device may emit infrared light toward a subject. For example, the emission of light from the light emitting device may mean that infrared light is emitted from the VCSEL. Also, the emission of light from the light emitting device may mean that light having a wavelength in a specific range is projected from the light emitting device.

The camera 121*b* may be a 3D camera or infrared camera used to extract depth information. The camera 121*b* may include an infrared (IR) pass filter for allowing infrared light received from the outside to pass therethrough and an image sensor capable of sensing infrared light. The image sensor may be implemented in the form of a charge-coupled device (CCD) or a complementary metal-oxide semiconductor (CMOS).

The camera 121*b* may sense infrared light received from the outside, i.e., infrared light emitted to a subject from the light emitting device included in the light emitting unit and then reflected and returned thereto. In addition, the controller 180 of the mobile terminal according to the exemplary embodiment may sense infrared light through the above-described sensing unit 140 (e.g., an infrared sensor (IR sensor)). Also, the camera 121*b* may sense light having a specific wavelength.

Meanwhile, the light emitting unit 124 may be formed to emit light toward a space corresponding to an image received through the camera 121*b*. Specifically, the plurality of light emitting devices 125 included in the light emitting unit 124 may emit light toward a space corresponding to an image 300 received through the camera.

Here, the space corresponding to the image 300 received through the camera may mean a space (a visual field of a scene) photographed by the camera among spaces (real spaces) except a space occupied by the mobile terminal 100. For example, the space corresponding to the image received through the camera may be determined based on an angle of view (viewing angle) of the camera.

For example, a specific light emitting device among the plurality of light emitting devices may be formed to emit light toward a space corresponding to a specific pixel(s) (a partial image or a portion) in an image received through the camera.

Meanwhile, the plurality of light emitting devices 125 included in the light emitting unit 124 may be grouped into a plurality of groups. At least two light emitting devices may be included in each of the plurality of groups. Specifically, the controller 180 may individually control the plurality of light emitting devices 125, or control the plurality of light emitting devices 125 in units of groups each including at least two light emitting devices. The plurality of light emitting devices may be grouped into groups having various forms, and the form of the group may be determined by a user's setting or control of the controller.

For example, as shown in FIG. 2A, light emitting devices included in a first group G1 among a plurality of groups G1, G2, . . . included in the light emitting unit 124 may be formed to emit light toward a space corresponding to a first portion R1 in the image 300 received through the camera 121*b*.

Also, light emitting devices included in a second group G2 different from the first group G1 among the plurality of groups G1, G2, . . . included in the light emitting unit 124 may be formed to emit light toward a space corresponding to a second portion R2 different from the first portion R1 in the image 300 received through the camera 121*b*.

More specifically, referring to FIG. 2B, an image 300 received through the camera may be output on the display 151 of the mobile terminal according to the exemplary embodiment. The image 300 may be an image corresponding to a space (a visual field of a scene or a subject) S photographed by the camera.

The light emitting unit 124 of the mobile terminal according to the exemplary embodiment may be formed to emit light toward the space S corresponding to the image 300.

The light emitting unit 124 may include a plurality of light emitting devices, and the plurality of light emitting devices may be grouped into a plurality of groups G1, G2, . . . . The light emitting devices included in the respective groups may be formed to emit light toward spaces corresponding to different portions in the image 300.

For example, light emitting devices included in a first group G1 among the plurality of groups may be formed to emit light toward a space S1 corresponding to a first portion R1 in the image 300, and light emitting devices included in a second group G2 among the plurality of groups may be formed to emit light toward a space S2 corresponding to a second portion R2 in the image 300.

To this end, referring to FIG. 2C, the light emitting unit 124 according to the exemplary embodiment may further include a lens 127. The lens 127 may refract or diffuse light emitted from the light emitting unit 124. The lens 127 may be one lens corresponding to the light emitting unit 124. Alternatively, the lens 127 may be implemented with a plurality of lenses formed to respectively correspond to the plurality of groups included in the light emitting unit 124. Alternatively, the lens 127 may be implemented with a plurality of lenses formed to respectively correspond to the plurality of light emitting devices included in the light emitting unit 124.

The controller 180 may control the lens 127 to emit light emitted from the light emitting unit 124 toward a space corresponding to an image received through the camera. Specifically, when the size of the light emitting unit 124 is greater than that of a space S corresponding to the image 300 received through the camera, the controller 180 may control the lens 127 such that light is emitted corresponding to the space S from the light emitting unit 124. To this end, the lens 127 may be formed such that its curvature is changed, or formed such that its position is moved.

Meanwhile, the plurality of light emitting devices included in the light emitting unit 124 may be arranged to form a predetermined pattern. Accordingly, in the present disclosure, depth information of an image received through the camera can be extracted by using the structure light method.

To this end, the plurality of light emitting devices 125 may be arranged or controlled by using various methods.

For example, referring to FIG. 3A, a plurality of light emitting devices may be arranged in a matrix form where they are arranged at a predetermined distance in the light emitting unit 124. The controller 180 may control some of the plurality of light emitting devices to emit light such that a predetermined pattern is formed. For example, the controller 180 may control the light emitting unit 124 such that a predetermined pattern Pa1 is formed by allowing only some light emitting devices 125*a* among a plurality of light emitting devices 125 arranged in a 4 by 4 matrix form to emit light.

As described above, the plurality of light emitting devices 125 may be grouped into a plurality of groups. The light emitting devices included in the plurality of groups may be controlled to form different patterns. As an example, the controller 180 may control light emitting devices to have a first pattern in a first group among the plurality of groups, and control light emitting devices to have a second pattern different from the first pattern in a second group different from the first group among the plurality of groups.

As another example, referring to FIG. 3B, a plurality of light emitting devices may be arranged to form a predetermined pattern in the light emitting unit 124. In this case, the plurality of light emitting devices may be arranged to form different patterns for respective groups.

For example, light emitting devices included in a first group among a plurality of groups may be arranged to form a first pattern Pa2, light emitting devices included in a second group among the plurality of groups may be arranged to form a second pattern Pa3, and light emitting devices included in a third group among the plurality of groups may be arranged to form a third pattern Pa4. Here, the first to third patterns may be different from one another.

In the above, it has been described that light emitting devices for each group are arranged or controlled to form a specific pattern. However, the present disclosure is limited thereto, and all the plurality of light emitting devices included in the light emitting unit 124 may be arranged or controlled to form a specific pattern.

As described in FIGS. 2A to 2C, light emitting devices which emit light toward a space corresponding a portion of an image received through the camera among the plurality of light emitting devices or light emitting devices included in a group formed to emit light toward a space corresponding to a portion of the image among the plurality of groups may be at least two light emitting devices formed (arranged) in a predetermined pattern as described in FIGS. 3A and 3B.

That is, in the present disclosure, when depth information on a specific portion in an image received through the camera, light may be emitted from light emitting devices (or light emitting devices included in a group) formed to emit light toward a space corresponding to the specific portion among the plurality of light emitting devices (or plurality of groups) included in the light emitting unit 124. Here, the light emitting devices formed to emit light toward the space corresponding to the specific portion may be formed (arranged) in a predetermined pattern. Accordingly, light emitted from the light emitting devices formed in the predetermined pattern in the light emitting unit 124 can be projected into the space corresponding to the specific portion. The light projected into the space may be reflected and returned to the mobile terminal.

Subsequently, in the present disclosure, depth information on the specific portion may be extracted based on the light reflected and returned from the space.

The mobile terminal of the present disclosure, which can include at least one of the components described above may control the plurality of light emitting devices included in the light emitting unit 124 in units of groups so as to extract depth information on an image received through the camera by using the optimized method.

Hereinafter, a method for controlling the light emitting unit according to an exemplary embodiment will be described in detail with reference to the accompanying drawings.

Figure 5:
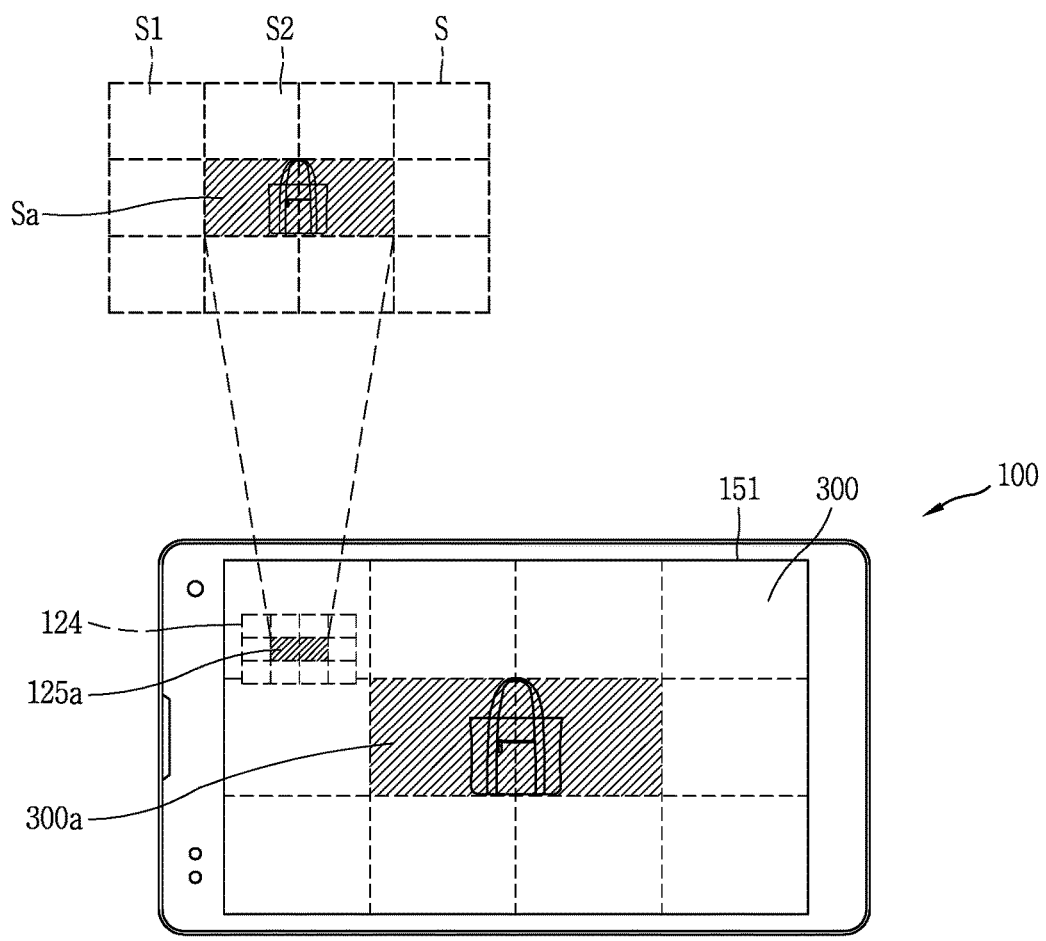
FIG. 5 is a conceptual diagram illustrating the control method described in FIG. 4.

FIG. 4 is a flowchart representatively illustrating a control method according to an exemplary embodiment. FIG. 5 is a conceptual diagram illustrating the control method described in FIG. 4.

First, referring to FIG. 4, an image is received through the camera (S410). The image received through the camera may be output on the display unit 151. The camera may be activated based on a user's request.

For example, the camera may be activated based on that an application related to the camera is executed.

Subsequently, light is emitted from light emitting devices which emit light toward a space corresponding to a portion of the image among a plurality of light emitting devices included in the light emitting unit 124 so as to extract depth information of the portion (S420).

As described above, a plurality of light emitting devices may be provided in the light emitting unit 124 provided in the mobile terminal according to the exemplary embodiment. The plurality of light emitting devices may be formed to emit light toward a space corresponding to an image received through the camera.

Specifically, the controller 180, as shown in FIG. 5, may select (set or specify) a portion in an image 300 received through the camera. The portion may be selected based on a user's request, or selected based on that a predetermined condition is satisfied.

As an example, in the state in which the image 300 received through the camera is output on the display 151, the controller 180 may select the portion, based on a point (area or portion) at which a touch input is applied to the image 300.

As another example, the controller 180 may select, as the portion, a predetermined area in the image received through the camera. The predetermined area may mean an area previously set by a user.

As still another example, the controller 180 may select, as the portion, an area having depth information within a predetermined range in the image received through the camera. Alternatively, when the image is divided into a plurality of areas to respectively correspond to a plurality of groups provided in the light emitting unit 124, the portion may be at least one area including an area having depth information within a predetermined range among the plurality of areas.

Also, the portion may be set or changed based on that the image is photographed or that the mobile terminal is moved by an external force.

Referring back to FIG. 5, if a portion 300a is selected from the image 300 received through the camera, the controller 180 may control light emitting devices 125a, which are formed to emit light toward a space Sa corresponding to the portion 300a among the plurality of light emitting devices provided in the light emitting unit 124, to emit light.

In other words, the controller 180 may groups the plurality of light emitting devices included in the light emitting unit 124 into a plurality of groups, and control light emitting devices 125a, which are included in a group formed to emit light to the space Sa corresponding to the portion 300a among the plurality of groups, to emit light.

The light emitting devices 125a may be arranged to form a predetermined pattern, and light may be projected in to the space Sa corresponding to the portion 300a so as to form the predetermined pattern. The controller 180 may sense light reflected and returned from the space through the camera or the sensing unit, and extract depth information of a portion in the image. As such, the structure light method of extracting depth information by using light arranged to form a predetermined pattern is a general technique, and therefore, its detailed description will be omitted.

As described above, light emitting devices (or groups) provided in the light emitting unit, an image received through the camera, and a space corresponding to the image may have a relationship in which they correspond to each other.

In the present disclosure configured as described above, when depth information on a portion in an image received through the camera is to be extracted, light is not emitted from all the plurality of light emitting devices provided in the light emitting unit, but light is emitted from some light emitting devices formed to emit light toward a space corresponding to the portion, so that it is possible to reduce power consumption and reduce peak power.

Hereinafter, various exemplary embodiments of controlling the light emitting unit will be described in detail with reference to the accompanying drawings.

Figure 6A:
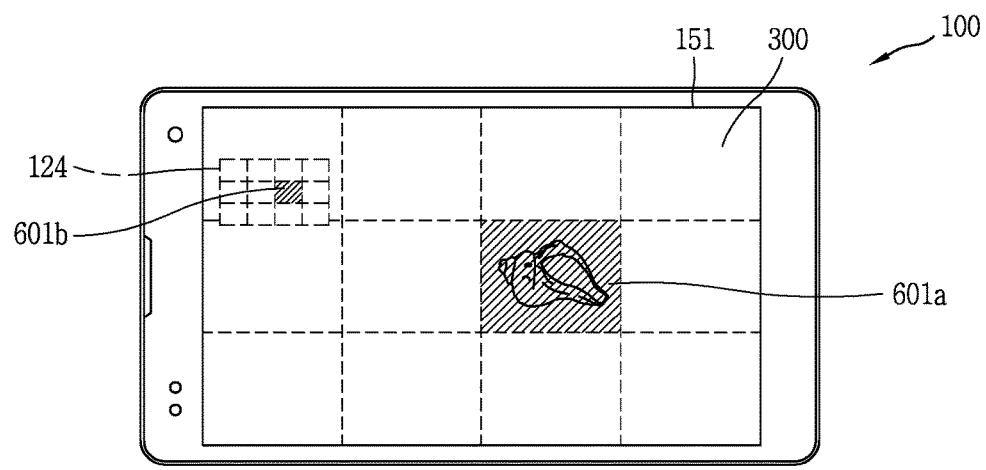
FIGS. 6A, 6B, and 7 are conceptual diagrams illustrating a method for controlling light emitting devices according to an exemplary embodiment.
Figure 6B:
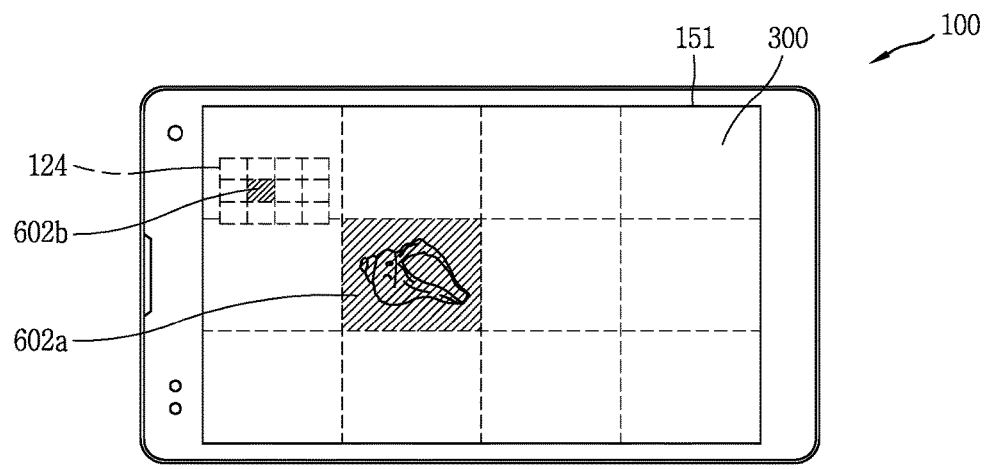
Figure 7:
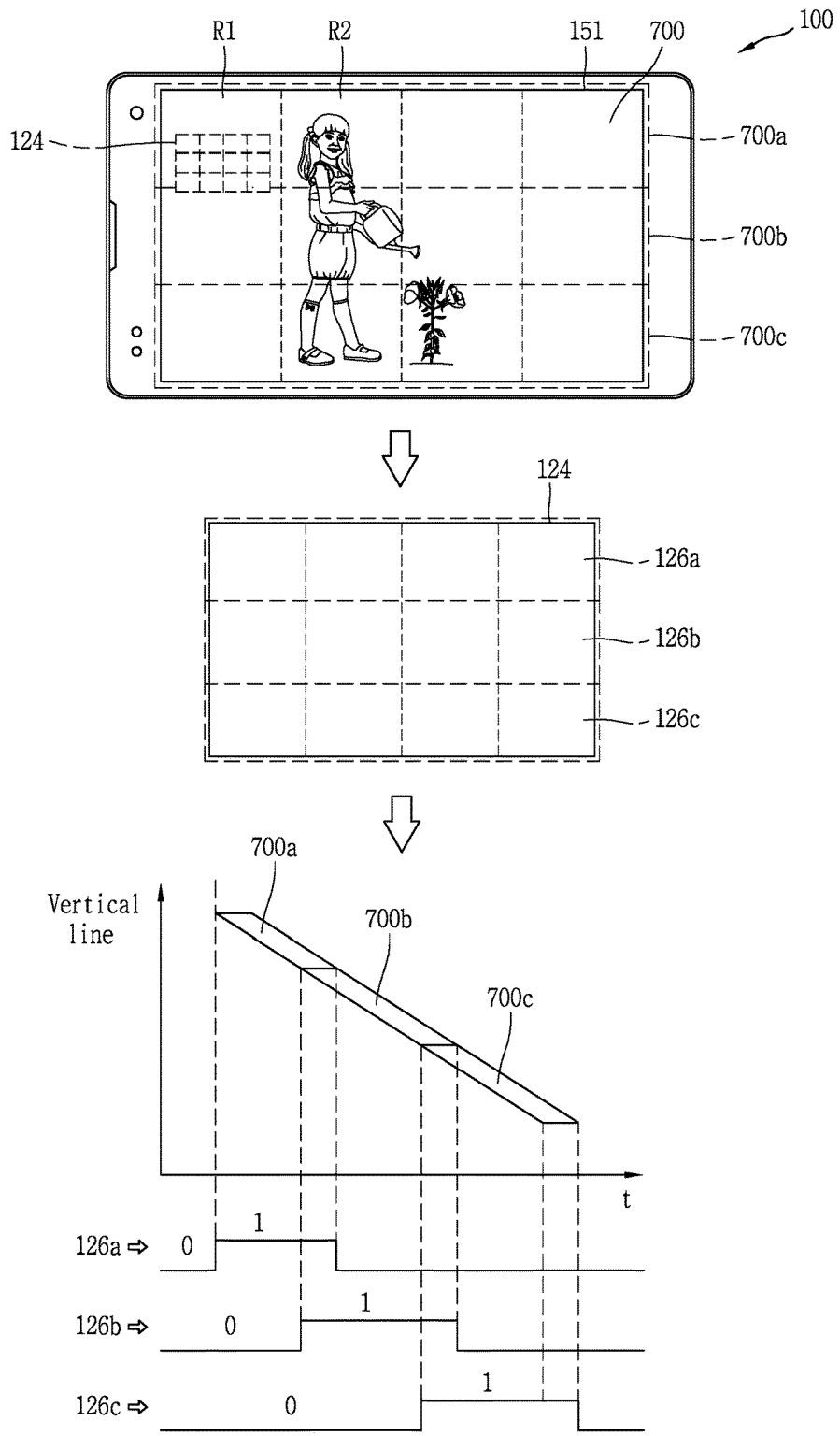

FIGS. 6A, 6B, and 7 are conceptual diagrams illustrating a method for controlling light emitting devices according to an exemplary embodiment.

The light emitting unit 124 according to the exemplary embodiment may include a plurality of light emitting devices, and the plurality of light emitting devices may be grouped into a plurality of groups.

When depth information corresponding to a portion in an image 300 received through the camera is to be extracted, the controller 180 may control light emitting devices, which are included in a group formed to emit light toward a space corresponding to the portion among the plurality of groups, to emit light.

Specifically, when depth information of a first portion in the image 300 is to be extracted, the controller 180 may control light emitting devices, which are included in a first group formed to emit light toward a space corresponding to the first portion among the plurality of groups, to emit light. Also, when depth information of a second portion different from the first portion in the image 300 is to be extracted, the controller 180 may control light emitting devices, which are included in a second group formed to emit light toward a space corresponding to the second portion among the plurality of groups, to emit light.

As an example, as shown in FIG. 6A, an image 300 received through the camera 121 may be divided (partitioned) into a plurality of areas. Here, the plurality of areas may correspond to a plurality of groups obtained by grouping a plurality of light emitting devices in the light emitting unit 124.

When depth information of a first portion (or a first area among the plurality of areas included in the image) 601a in the image 300 is extracted, the controller 180 may control light emitting devices, which are included in a group 601b formed to emit light toward a space corresponding to the first portion 601a among the plurality of groups included in the light emitting unit 124, to emit light.

As another example, as shown in FIG. 6B, when depth information of a second portion (or a second area among the plurality of areas included in the image) 602a in the image 300 is extracted, the controller 180 may control light emitting devices, which are included in a group 602b formed to emit light toward a space corresponding to the second portion 602a among the plurality of groups included in the light emitting unit 124, to emit light.

Meanwhile, when the image 300 received through the camera is photographed (captured) as a still image, the controller 180 may control a plurality of light emitting devices included in the light emitting unit 124 by using a predetermined method.

Specifically, when the image 300 is photographed as a still image, the controller 180 may control a plurality of groups set in the light emitting unit 124 to sequentially emit light in a predetermined order as time elapses. Here, the predetermined order may be determined based on an order in which a plurality of areas included in the image 300 are photographed as still images as time elapses.

For example, the mobile terminal according to the exemplary embodiment may photograph (pick up or capture) an image received through the camera. The image may be photographed based on a user's image photographing command. If the image photographing command is received, the controller 180 may control a shutter provided in the camera such that the image is photographed as a still image, and store the photographed still image in the memory 170 (see FIG. 1A).

In this case, the controller 180 may control the shutter provided in the camera to be sequentially opened/closed so as to photograph the image as a still image. For example, when the image sensor provided in the camera 121 is implemented in the form of a CMOS, the shutter may be a rolling shutter.

The predetermined method may be a photographing method using the rolling shutter or a method of photographing an image received through the camera while scanning the image in one direction. The scanning may be sequentially performed in units of rows or columns (pixels (or areas) corresponding to one line).

For example, as shown in FIG. 7, when the rolling shutter is used, the controller 180 may sequentially photograph an image 700 received through the camera 121 in one direction (e.g., a direction from top to bottom) as time elapses. That is, images corresponding to a first area 700a disposed at the uppermost portion in the image 700, a second area 700b, and a third area 700c may be sequentially photographed from the first area 700a in the one direction as time elapses. In this case, the image corresponding to the first area 700a may be first photographed, and the image corresponding to the third area 700c may be photographed last.

The controller 180 may photograph (generate or store), as one still image, the image received through the camera by sequentially photographing images corresponding to the first to third areas.

That is, when images corresponding to the first area 700a, the second area 700b, and the third area 700c are sequentially photographed as time elapses, the controller 180 may control a plurality of light emitting devices to emit light, corresponding to an order in which the images are photographed, according to characteristics of the rolling shutter.

For example, when a first image corresponding to the first area 700a in the image 700 received through the camera is photographed as shown in first to third figures of FIG. 7, the controller 180 may control light emitting devices, which are included in a first group 126a formed to emit light toward a space corresponding to the first image among the plurality of groups included in the light emitting unit 124, to emit light (1).

Subsequently, when a second image corresponding to the second area 700b is photographed after the photographing of the first image is performed, the controller 180 may control light emitting devices, which are included in a second group 126b formed to emit light toward a space corresponding to the second image among the plurality of groups, to emit light (1).

When the photographing of the first image is completed, the controller 180 may control the light emitting devices, which are included in the first group 126a formed to emit light toward the space corresponding to the first image, to be turned off (0).

Subsequently, when a third image corresponding to the third area 700c is photographed after the photographing of the second image is performed, the controller 180 may control light emitting devices, which are included in a third group 126c formed to emit light toward a space corresponding to the third image among the plurality of groups, to emit light (1).

When the photographing of the second image is completed, the controller 180 may control the light emitting devices, which are included in the second group 126b formed to emit light toward the space corresponding to the second image, to be turned off (0).

As shown in the third figure of FIG. 7, the light emitting devices included in the first and second groups 126a and 126b may simultaneously emit light for a certain time, or sequentially emit light. Similarly, the light emitting devices included in the second and third groups 126b and 126c may simultaneously emit light for a certain time, or sequentially emit light.

As described above, when an image received through the camera is photographed as a still image, the controller 180 may control a plurality of areas included in the image to be sequentially photographed in a predetermined order as time elapses, according to the characteristics of the rolling shutter. In this case, the controller 180 may control a plurality of groups included in the light emitting unit 124, which are grouped corresponding to the plurality of areas, to sequentially emit light in the predetermined order as time elapses. That light is emitted from the plurality of groups included in the light emitting unit 124 should be understood that light is emitted from the light emitting devices included in the plurality of groups.

The predetermined order may be an order in which the plurality of areas included in the image are photographed as still images as time elapses.

As such, the controller 180 may control an area photographed at a specific point of time in the image and a group formed to emit light toward a space corresponding to the area to be synchronized with each other.

The controller 180 control the camera to photograph the image as a still image in a state in which light emitted from light emitting devices formed in a predetermined pattern is projected. Accordingly, the controller 180 can extract depth information based on the photographed still image.

In the present disclosure configured as described above, when an image is photographed, it is possible to reduce peak power for allowing light emitting devices used in extracting depth information to emit light. In the present disclosure, there can be provided a control method in which the peak power is reduced, so that it is possible to extract depth information of an image or photograph an image by using the optimized method, without having a complicated configuration for increasing the peak power.

Meanwhile, the mobile terminal according to the exemplary embodiment may control the light emitting unit in different manners, based on an operation mode related to the camera.

Specifically, in a first operation mode related to the camera, the controller 180 may control a plurality of groups (or light emitting devices included in the plurality of groups) included in the light emitting unit in a first manner. Also, in a second operation mode related to the camera, which is different from the first operation mode, the controller 180 may control the plurality of groups included in the light emitting unit by using a second manner different from the first manner. Hereinafter, various embodiments in which the light emitting unit is differently controlled for each operation mode related to the camera will be described in detail with reference to the accompanying drawings.

Figure 8:
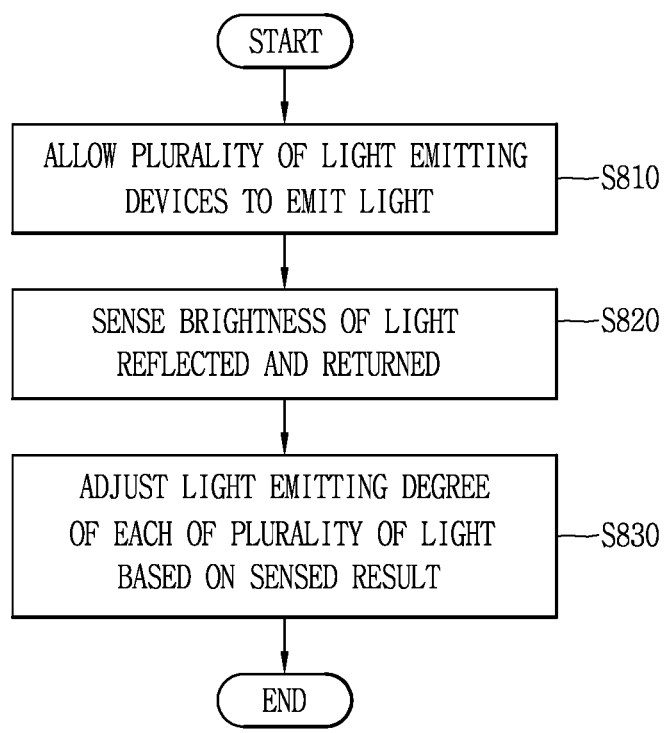
FIG. 8 is a flowchart illustrating a control method of adjusting light emitting degrees of a plurality of light emitting devices.

FIG. 8 is a flowchart illustrating a control method of adjusting light emitting degrees of a plurality of light emitting devices, and FIG. 9 is a conceptual diagram illustrating the control method described in FIG. 8.

Figure 11:
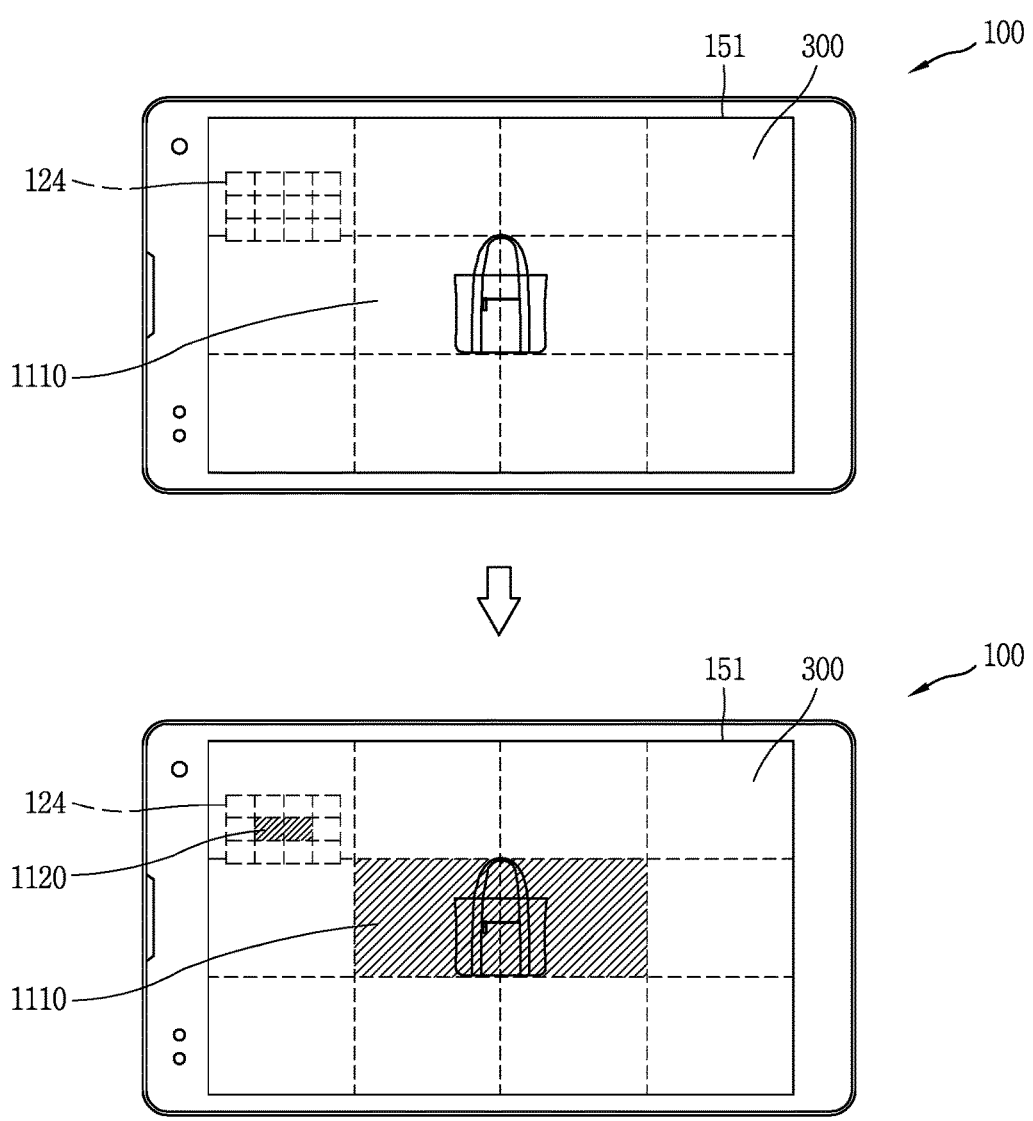
FIGS. 11 and 13 are conceptual diagrams illustrating the control methods described in FIGS. 10 and 12, respectively.
Figure 12:
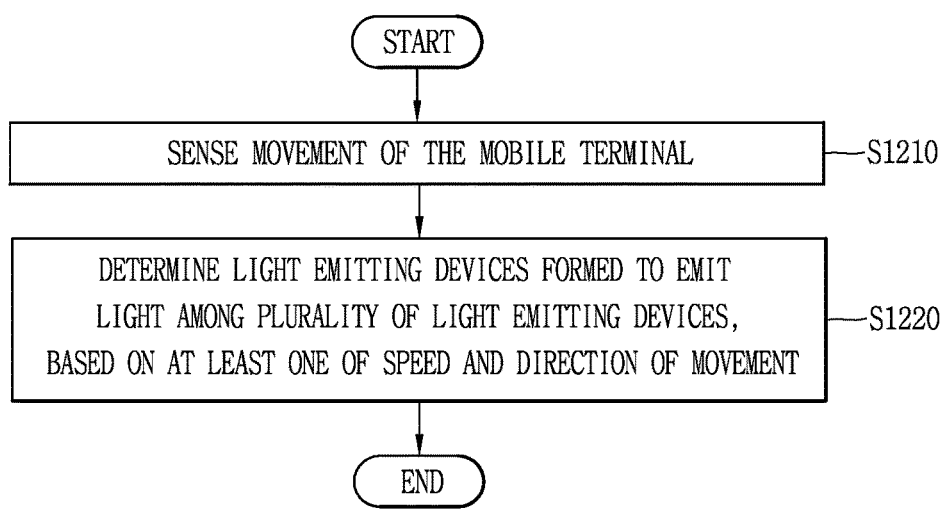
Figure 13:
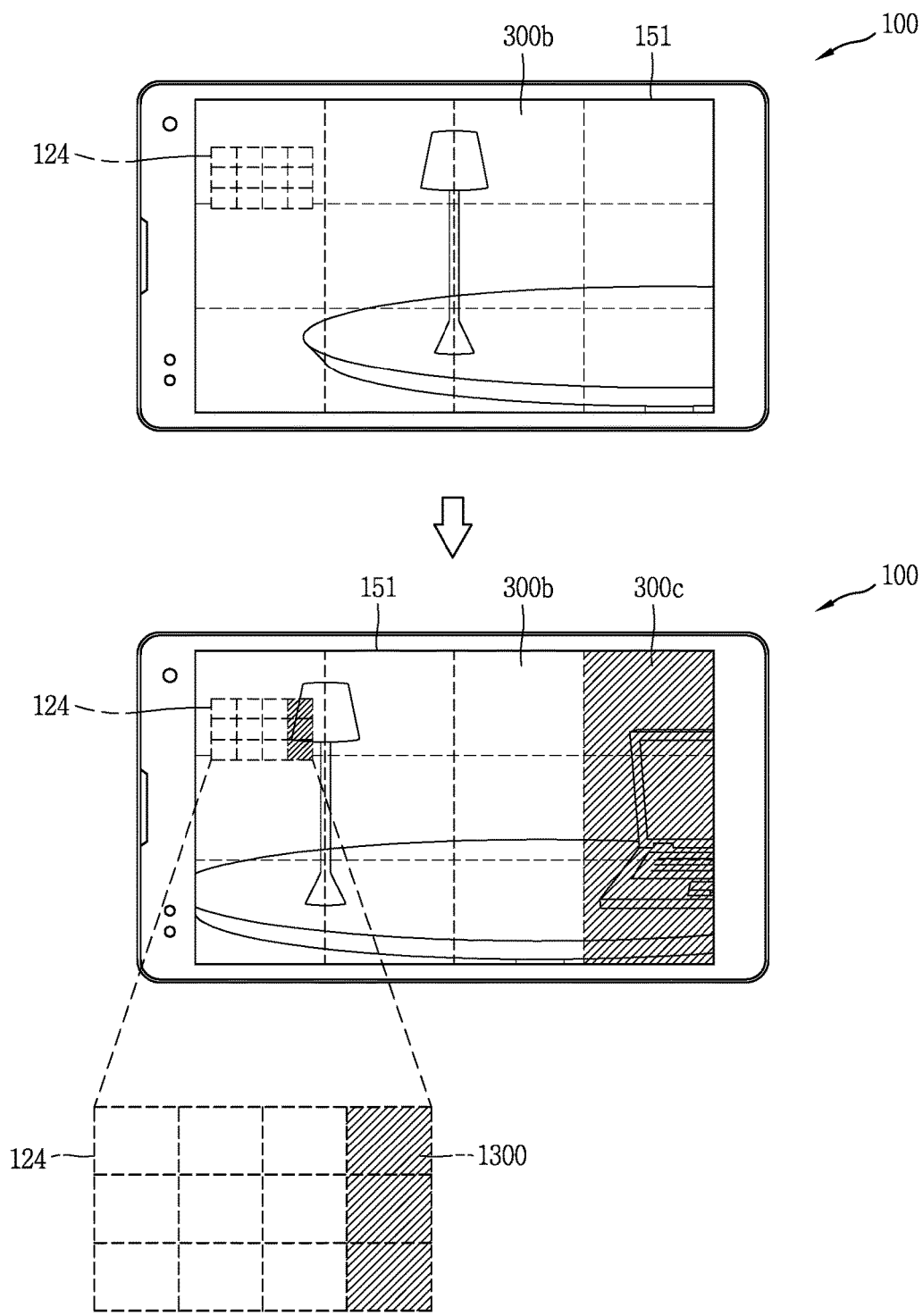

FIGS. 10 and 12 are flowcharts illustrating control methods of controlling the light emitting unit in different manners according to operation modes of the camera, and FIGS. 11 and 13 are conceptual diagrams illustrating the control methods described in FIGS. 10 and 12, respectively.

First, the operation mode related to the camera may include various operation modes. For example, the operation mode related to the camera may include a first mode for adjusting (regulating, setting, or determining) light emitting degrees of a plurality of light emitting devices, a second mode for extracting only depth information corresponding to a specific area, a third mode for photographing a space wider than a specific space corresponding to an image received through the camera by moving the mobile terminal, and the like.

The first mode for adjusting (regulating, setting, or determining) light emitting degrees of a plurality of light emitting devices will be described with reference to FIGS. 8 and 9.

The first mode for adjusting the light emitting degrees of the plurality of light emitting devices may be called as an initial setting mode, etc.

Referring to FIG. 8, when the operation mode relate to the camera is the first mode, light is emitted from a plurality of light emitting devices included in the light emitting unit 124 (S810). The plurality of light emitting devices may emit light having a predetermined brightness (intensity).

The light emitted from the plurality of light emitting devices may be projected into a space corresponding to an image received through the camera. The light projected into the space may be reflected by a subject existing in the space and then returned to the mobile terminal.

As the plurality of light emitting devices emit light, the controller 180 may sense a brightness (intensity) of the light reflected by the subject and then returned to the mobile terminal (S820).

Subsequently, the light emitting degree of each of the plurality of light emitting devices is adjusted based on the sensed result (S830).

As described in FIG. 2C, the lens 127 may be included in the light emitting unit 124. For example, the light emitting unit 124 may include a lens for refracting light emitted from the plurality of light emitting devices.

The controller 180 may adjust light emitting degrees of the plurality of light emitting devices, based on the brightness of light passing through the lens 127 and then being reflected by an object and returned to the mobile terminal.

Specifically, the brightness (intensity) of the reflected and returned light may be different from the intensity of light emitted from the plurality of light emitting device, based on refraction/diffusion of the light due to the lens 127, scattering, spherical aberration, absorptance of the light into the object, moving distance of the light, etc.

Therefore, the intensity of light sensed in a first area included in an image received through the camera may be different from the intensity of light sensed in a second area different from the first area. For example, when the first area is a central portion and the second area is an outer portion, the intensity of the light sensed in the first area may be greater than the intensity of the light sensed in the second area.

For example, as shown in FIG. 9, the brightness of light corresponding to a first area 910a in an image 900 displayed on the display unit 151 may be greater than the brightness of light corresponding to a second area 910b different from the first area 910a.

In this case, the controller 180 may decrease the light emitting degrees of light emitting devices 920a formed to emit light toward a space corresponding to the first area 910a, or increase the light emitting degrees of light emitting devices 920b formed to emit light toward a space corresponding to the second area 910b. That is, the controller 180 may control the light emitting unit 124 such that the brightness of light within a predetermined range is sensed with respect to the whole of the image 900 received through the camera (such that the uniform brightness of light is sensed).

In the present disclosure configured as described above, there can be provided a control method capable of controlling a plurality of light emitting devices such that the brightness of light within a predetermined range is sensed in an image received through the camera. That is, in the present disclosure configured as described above, it is possible to improve the uniformity of a plurality of light emitting devices provided in the light emitting unit.

Hereinafter, the second mode for extracting only depth information corresponding to a specific area will be described with reference to FIGS. 10 and 11.

Referring to FIG. 10, when the operation mode related to the camera is the second mode, an image is received through the camera (S1010).

Subsequently, an area having depth information within a predetermined range is extracted from the received image (1020). Specifically, if an image is received through the camera, the controller 180 may extract depth information of the image.

The depth information may be extracted based on, for example, at least one of the stereo vision method, the structure light method, and the ToF method.

The controller 180 may extract an area having depth information within a predetermined range from the image. For example, the depth information within the predetermined range may be depth information where the distance between the camera and a target subject is within a specific distance range. The target subject may mean a subject from which depth information is to be extracted.

Meanwhile, the controller 180 may set the predetermined range, based on depth information of an image corresponding to a predetermined area in the image. Specifically, the area having the depth information within the predetermined range may be extracted based on depth information of an image corresponding to a predetermined area in the image.

For example, the predetermined area may be a central portion in an image received through the camera. An indicator for notifying the predetermined area may be displayed on the display unit 151.

The controller 180 may extract depth information corresponding to the central portion, and set a predetermined range based on the extracted depth information. This is provided for the purpose of extracting depth information of an image corresponding to the target subject.

Subsequently, the controller 180 may set an area having the depth information within the predetermined range in the image received through the camera. The set area may be an area including an image corresponding to the target subject. Also, the area except the set area in the image received through the camera may be a background area.

Referring to a first figure of FIG. 11, the controller 180 may extract an area 1110 having depth information within a predetermined range from an image 300 received through the camera. The area 1110 may be an area including an image (picture) corresponding to a target subject among a plurality of areas included in the image 300.

Subsequently, light is emitted from light emitting devices formed to emit light toward a space corresponding to the extracted area among a plurality of light emitting devices provided in the light emitting unit (S1030).

Specifically, the controller 180 may control only light emitting devices, which are formed to emit light toward a space corresponding to the extracted area among the plurality of light emitting devices, to emit light, and control light emitting devices, which are formed to emit light toward a space corresponding to the area except the extracted area, to be turned off.

For example, as shown in a second figure of FIG. 11, the controller 180 may control only light emitting devices (or a group) 1120, which are formed to emit light toward a space corresponding to the extracted area 1110 among the plurality of light emitting devices (or the plurality of groups) included in the light emitting unit 124, to emit light. In this case, the other light emitting devices among the plurality of light emitting devices may be turned off.

That is, in the present disclosure, the light emitting unit is controlled such that light is projected onto only a target subject, and is not projected into the background space except the target subject, thereby preventing power consumption.

Hereinafter, the third mode for photographing a space wider than a specific space corresponding to an image received through the camera by moving the mobile terminal will be described with reference to FIGS. 12 and 13.

The sensing unit 140 (see FIG. 1A) provided in the mobile terminal according to the exemplary embodiment may sense a movement of the mobile terminal. When the operation mode related to the camera is the third mode, a movement of the mobile terminal is sensed through the sensing unit (S1210).

The controller 180 may determine a speed, a direction, etc. of the movement.

Subsequently, light emitting devices (or a group) formed to emit light among the plurality of light emitting devices (or the plurality of groups) included in the light emitting unit are determined based on at least one of the speed and direction of the movement (S1220).

Specifically, a new image may be received to the camera by the movement. In this case, the controller 180 may control light emitting devices, which are included in a group formed to emit light toward a space corresponding to the new image among a plurality of groups included in the light emitting unit 124, to emit light. Here, the group (or light emitting devices) formed to emit light toward the space corresponding to the new space may be determined based on at least one of the speed and direction of the movement.

For example, as shown in FIG. 13, an image 300b received through the camera may be output on the display unit 151. The depth information of the image 300b may be extracted by using at least one method among the above-described methods.

Subsequently, if the mobile terminal is moved by an external force, the camera may receive a new image 300c different from the image 300b. In this case, the controller 180 may control light emitting devices (or a group), which are formed to emit light toward a space corresponding to the new image 300c among a plurality of light emitting devices (or a plurality of groups) included in the light emitting unit 124, to emit light, based on the speed and direction of the movement. Subsequently, the controller 180 may extract depth information of the new image 300c.

In the present disclosure configured as described above, light emitting devices emit light toward only a space corresponding to an image newly received by a movement of the mobile terminal, so that it is possible to limit the emission of light toward a space corresponding to an image of which depth information has been already extracted, thereby reducing power consumption.

The exemplary embodiments described in FIGS. 8 to 13 may be implemented by combining at least two of the above-described methods.

Hereinafter, a method for decreasing peak current for allowing light emitting devices to emit light will be described in detail with reference to the accompanying drawing.

FIG. 14 is a conceptual diagram illustrating a method for controlling a plurality of light emitting devices provided in the light emitting unit according to an exemplary embodiment.

The mobile terminal according to the exemplary embodiment, which may include at least one of the components described above, may control a plurality of light emitting devices included in the light emitting unit 124 to decrease peak power (current).

The peak power refers to power for allowing at least one light emitting device to emit light together (at the same time).

For example, power of a [W] is required to allow one light emitting device to emit light. When light is emitted from n light emitting devices, their peak power may be a*n [W].

In order to increase the peak power, complicated components should be provided. Therefore, the product cost of the mobile terminal increases, and the volume of the mobile terminal increases. Also, the weight of the mobile terminal increases.

The mobile terminal according to the exemplary embodiment allows a plurality of light emitting devices provided in the light emitting unit to sequentially emit light within a predetermined time, thereby decreasing peak power.

For example, as shown in FIG. 14, when light is emitted from n light emitting devices 125 (or n light emitting devices provided in any one 1400 of a plurality of groups), the controller 180 may control the n light emitting devices 125 to sequentially emit light in a predetermined order. In this case, the controller 180 may control the n light emitting devices to sequentially alternately emit light without any time when the n light emitting devices simultaneously emit light.

The n light emitting devices, as described above, may be light emitting devices formed to emit light toward a space corresponding to a portion of an image received through the camera, or light emitting devices included in a group formed to emit light toward the space corresponding to the portion of the image among a plurality of groups. Also, the n light emitting devices may be formed (arranged) in a predetermined pattern.

The predetermined time may be determined by a user's setting, and is preferably a short time which cannot be perceived by the user's sight. This is provided for the purpose of, although the plurality of light emitting devices (n light emitting devices) sequentially emit light within a predetermined time, emitting light corresponding to the intensity of light when the plurality of light emitting devices (n light emitting devices) simultaneously emit.

In the present disclosure configured as described above, the peak power can be decreased by 1/n as compared with that when n light emitting devices simultaneously emit light.

As described above, according to the present disclosure, there can be provided a control method in which light is emitted toward only a space corresponding to a portion (an area set by a user or a predetermined area) of an image received through the camera, so that it is possible to extract depth information of the portion of the image by using the optimized method.

Also, according to the present disclosure, when the depth information of an image received through the camera is extracted, it is possible to minimize the power of light emitting devices and improve the success rate in extracting depth information.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
a light emitting unit comprising a plurality of light emitting elements, wherein the plurality of light emitting elements are grouped into a plurality of groups;
a camera configured to process an image of an object;
a controller operably connected to the light emitting unit and the camera and configured to control the light emitting unit to emit light to the object,
wherein the controller configured to:
control the plurality of groups to emit light sequentially in a predetermined order while one image of the object is captured, so that a peak power of the plurality of groups to emit light sequentially is lower than a peak power of the plurality of groups emitting light simultaneously, and identify the depth information of the object using the image processed via the camera based on the light sequentially emitted from the plurality of groups to the object wherein the plurality of light emitting elements included in each of the plurality of groups are arranged to form different patterns such that all of the plurality of groups emit different light patterns.

2. The mobile terminal of claim 1, wherein the controller is further configured to control the plurality of groups to sequentially emit light in the predetermined order as time elapses within the predetermined time.

3. The mobile terminal of claim 1, wherein the plurality of light emitting elements emit light having a predetermined brightness.

4. The mobile terminal of claim 1, wherein each of the plurality of groups including the plurality of light emitting elements emits light having a predetermined brightness.

5. The mobile terminal of claim 1, wherein the controller controls a light emission time of each the plurality of groups and a light emission intensity of each the plurality of groups, independently.

6. The mobile terminal of claim 5, wherein at least one of the light emission time of each the plurality of groups or the light emission intensity of each the plurality of groups is set by a user.

7. The mobile terminal of claim 1, the controller extracts the depth information of the image based on at least one of a stereo vision method, a structure light method or a Time of Flight method.

8. The mobile terminal of claim 7, wherein a pattern formed by light emitted from the plurality of light elements is used for the stereo vision method or the structure light method and a time for which light emitted from the light emitting elements is reflected and returned is used for the Time of Flight method.

9. The mobile terminal of claim 1, wherein further comprising:
a lens corresponding to the light emitting unit.

10. The mobile terminal of claim 1, wherein further comprising:
a plurality of lenses formed to respectively correspond to the plurality of light emitting elements included in the light emitting unit.

11. The mobile terminal of claim 1, wherein the controller is further configured to control the plurality of groups to sequentially emit light in an alternate manner without a time when at least two of the plurality of groups simultaneously emit light.

* * * * *